No. 803,518. PATENTED OCT. 31, 1905.
W. A. ALEXANDER.
AUTOMATIC SHUT OFF VALVE FOR FLUSH TANKS.
APPLICATION FILED OCT. 20, 1904.
2 SHEETS—SHEET 1.
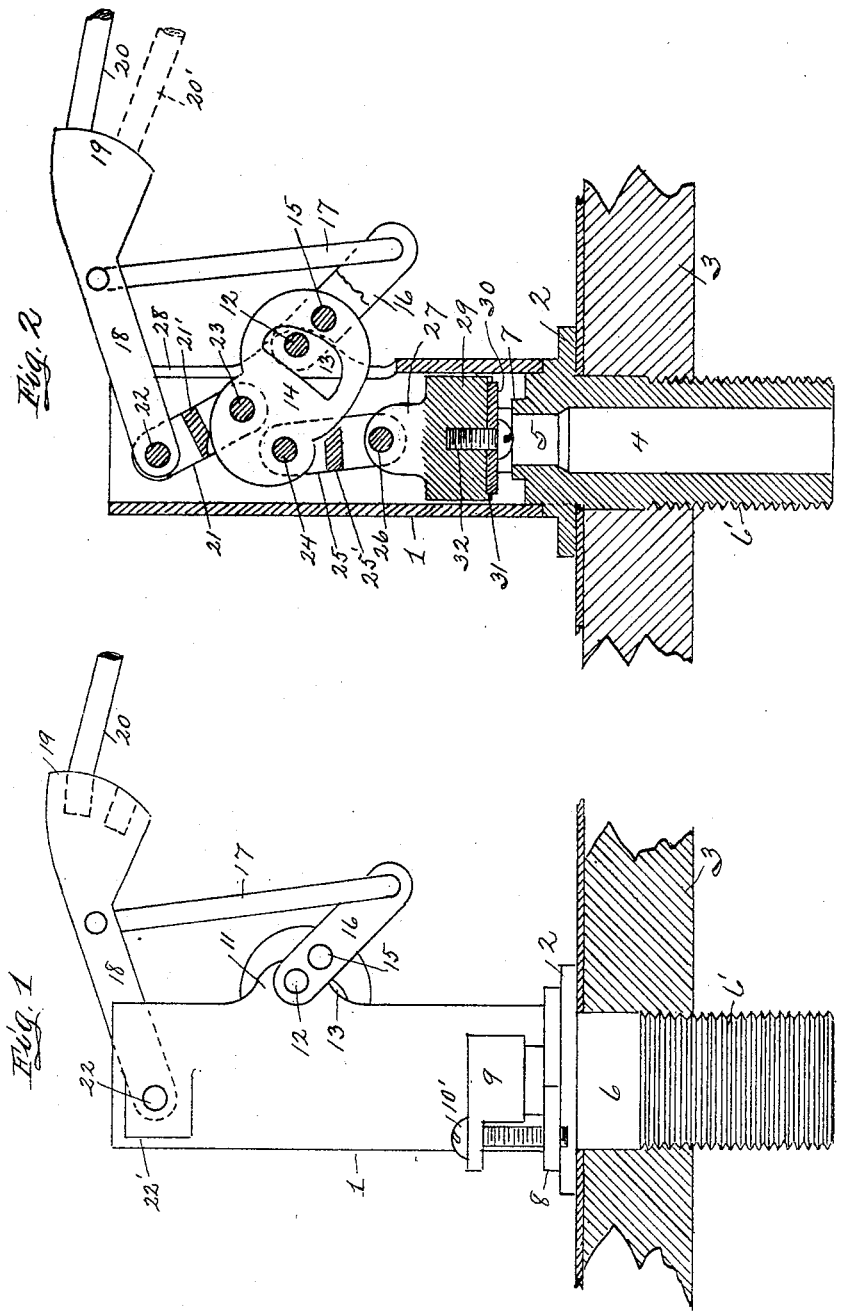

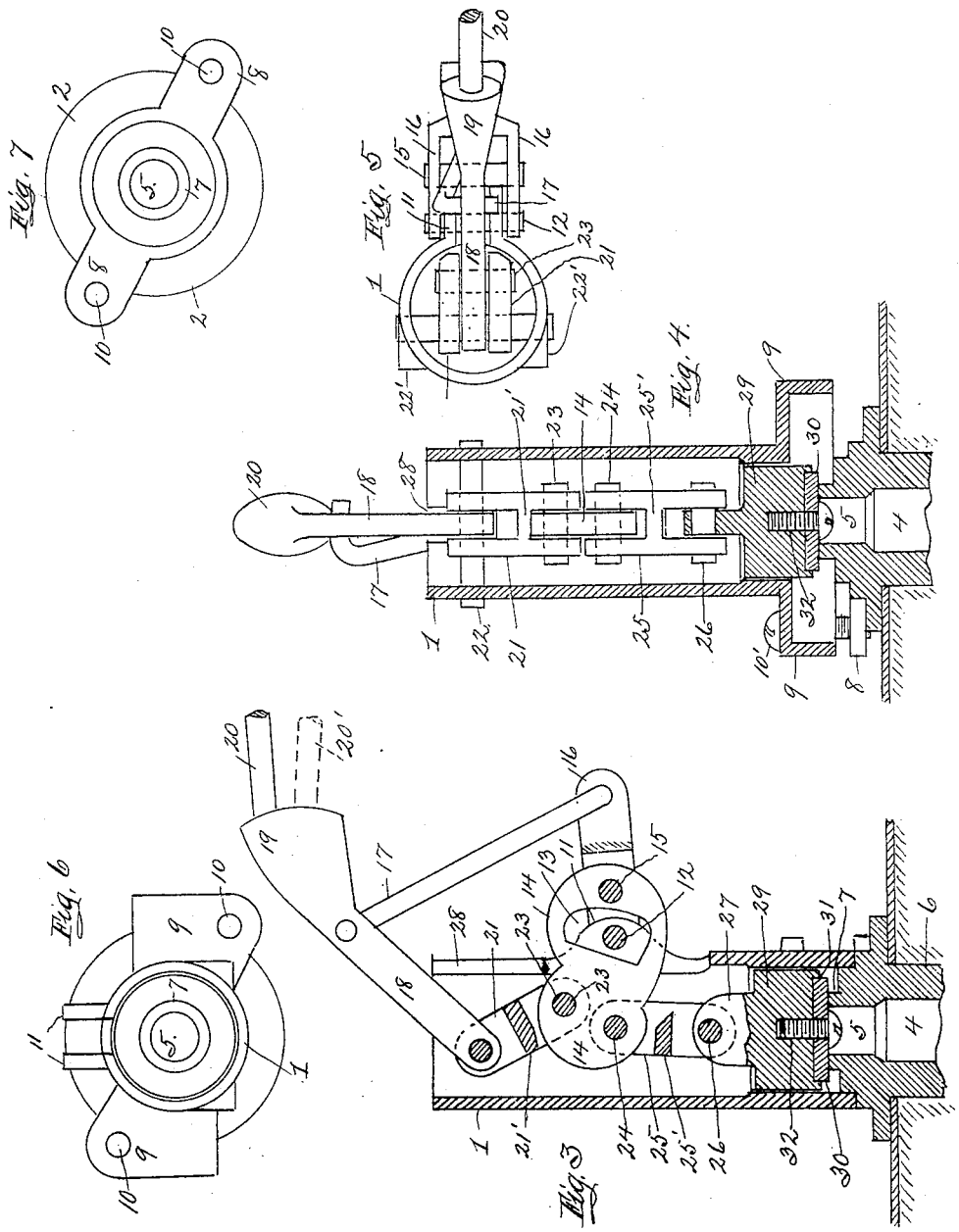

UNITED STATES PATENT OFFICE.

WILLIAM A. ALEXANDER, OF WILKINSBURG, PENNSYLVANIA.

AUTOMATIC SHUT-OFF VALVE FOR FLUSH-TANKS.

No. 803,518. Specification of Letters Patent. Patented Oct. 31, 1905.

Application filed October 20, 1904. Serial No. 229,262.

*To all whom it may concern:*

Be it known that I, WILLIAM A. ALEXANDER, a citizen of the United States, residing at Wilkinsburg, in the county of Allegheny and State of Pennsylvania, have invented certain new and useful Improvements in Automatic Shut-Off Valves for Flush-Tanks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved automatic shut-off valve for flush-tanks; and it consists in the certain details of construction and combination of parts, as will be fully described hereinafter.

In the accompanying drawings, Figure 1 is an outside elevation of my improved automatic shut-off valve for flush-tanks, the same being constructed and arranged in accordance with my invention. Fig. 2 is a sectional side elevation of the same in which the valve is shown open to permit the entrance of water into the tank. Fig. 3 is a similar view showing the valve seated or closed, being the position of the parts when the tank is full of water. Fig. 4 is an end sectional elevation of the same. Fig. 5 is a plan view of the valve. Fig. 6 is a plan view of the casing having the working parts removed. Fig. 7 is a plan view of the base and its integral valve-seat.

To construct an automatic shut-off valve for flush-tanks used in connection with water-closets, I provide a base portion consisting of an annular flange 2, adapted to rest upon the bottom 3 of the tank, a downwardly-extending shank 6, a portion 6' of which is threaded to afford a means of connecting a water-supply pipe thereto and to attach the said base by means of a threaded nut or washer in a manner well known in the art. This base portion is formed with an inner annular bore 4, the top 5 of which is contracted or reduced in diameter, terminating in a valve-seat 7. Radially-extending lugs 8 are formed integral with the base, in which threaded openings 10 are made for the reception of screws 10', for the purpose of connecting thereto a cylindrical shell 1, open at the top and formed at the base with box-shaped parts 9, which serve to break the force of water flowing from the open valve and also as a means of connection with the lugs 8 of the base. This shell or cylinder is arranged in a vertical position and is formed with a slot 28, extending from the top some distance down one side, and at either side in a suitable position outwardly-projecting lugs 11 are provided, in which a transverse shaft or pin 12 is fixed. Loosely arranged upon this pin 12 is a yoke 16, carrying a short lever 14, journaled to a pin 15 at its outer end, the said lever being formed with a slot 13 to prevent interference with the pin 12 and is attached at its inner end by short pins 23 and 24 to two links 21 and 25, the one, 25, extending downward to connect with a valve 29 and the other, 21, upward to connect with a lever 18, operated by a float, as will be hereinafter described. Each of these links 21 and 25 is double, joined at the center by integral portions 21' and 25'. The valve above mentioned consists of a cylindrical body 29, an upwardly-extending lug 27 for connection (by means of a pin 26) with the link 25, and a recessed base 31, in which a gasket or washer 30 is placed and held in position by a screw 32. The upper link 21 is pivotally connected to a fixed pin 22, to which a lever 18 is also connected, and the said lever by a rod 17 to the outer end of the yoke 16. This lever 18 is formed with an enlarged outer end 19, in which are threaded openings, the one arranged above the other, in which the float-lever 20 is attached, the said lever being fitted at its outer end with a hollow ball or float in a manner common in the art and when arranged as shown in the drawings (in the upper threaded opening) will permit more water to enter the tank than if arranged as shown in dotted lines at 20', as is obvious.

In operation the outlet-valve (not shown) of the tank when opened to drain the tank permits the float to descend, moving the outer end of the yoke 16 downward, carrying the short lever 14 with it and releasing the pressure upon the top of the valve 29. This pressure removed from the valve 29 will permit the water-pressure to lift said valve, giving free entrance to the water until the same has reached the level of the float. The water arising in the tank will gradually lift the throat, thereby elevating the lever 18 and its connected yoke 16. The said yoke acting on the short lever 14 tends to bring the two links 21 and 25 the one in line with the other, and as the upper link 21 is fixed to the pin 22 the valve 29 must move downward to its seat 7, thereby shutting off the supply of water to the tank.

By reason of the compound leverage exerted on the valve 29, as above described, the said valve is held tightly to its seat regardless of the water-pressure beneath. The two links 21 and 25 being in line with one another, or about so, the water-pressure beneath will have little influence upon the float, as the valve 29 is actually locked until released by the downward movement of the float.

Various slight modifications and changes may be made in the details of construction without departing from the spirit of the intion. Therefore I do not wish to confine myself to the exact construction shown and described.

Having thus described my invention, what I claim, and desire to secure by Letters Patent, is—

A shut-off valve for flush-tanks, consisting of the base portion provided with a means for connection with a water-supply pipe and formed with a valve-seat, the valve 29, operating within a casing, the float-lever 18, the short lever 14, the yoke 16 connected thereto, the float-lever 18 connected to said yoke, the double-link connections 21 and 25 connecting the valve 29 and the float-lever with the intermediate lever 14, in a manner that will cause the two links to be brought the one in line with the other when the float moves upward, as and for the purpose described.

In testimony whereof I affix my signature in presence of two witnesses.

WILLIAM A. ALEXANDER.

Witnesses:
FRED O. HENZI,
H. J. LEVIS.